(12) United States Patent
Rahlff (10) Patent No.: US 8,360,365 B2
(45) Date of Patent: Jan. 29, 2013

(54) MODULAR HATRACK FOR A PASSENGER COMPARTMENT OF AIRCRAFT

(75) Inventor: Thimo Rahlff, Hamburg (DE)

(73) Assignee: Airbus Operations GmbH (DE)

(*) Notice: Subject to any disclaimer, the term of this patent is extended or adjusted under 35 U.S.C. 154(b) by 152 days.

(21) Appl. No.: 12/665,993

(22) PCT Filed: Jun. 27, 2008

(86) PCT No.: PCT/EP2008/058275
§ 371 (c)(1),
(2), (4) Date: Apr. 19, 2010

(87) PCT Pub. No.: WO2009/003945
PCT Pub. Date: Jan. 8, 2009

(65) Prior Publication Data
US 2010/0206985 A1   Aug. 19, 2010
US 2012/0292445 A9   Nov. 22, 2012

Related U.S. Application Data

(60) Provisional application No. 60/937,686, filed on Jun. 29, 2007.

(30) Foreign Application Priority Data

Jun. 29, 2007   (DE) .................. 10 2007 030 331

(51) Int. Cl.
*B64D 11/00* (2006.01)
*B64D 13/00* (2006.01)
(52) U.S. Cl. ............... 244/118.5; 244/118.1; 454/71; 454/76

(58) Field of Classification Search ........... 244/118.5, 244/118.1, 118.6; 454/71–77
See application file for complete search history.

(56) References Cited

U.S. PATENT DOCUMENTS

| | | | |
|---|---|---|---|
| 5,108,048 A * | 4/1992 | Chang | 244/118.1 |
| 5,347,434 A * | 9/1994 | Drake | 244/118.5 |
| 5,441,218 A * | 8/1995 | Mueller et al. | 244/118.5 |
| 5,441,326 A * | 8/1995 | Mikalonis | 296/208 |
| 5,651,733 A * | 7/1997 | Schumacher | 454/76 |
| 5,779,193 A * | 7/1998 | Sloan | 244/118.5 |
| 5,842,668 A * | 12/1998 | Spencer | 244/118.1 |
| 6,241,186 B1 * | 6/2001 | Calnon | 244/118.5 |
| 6,273,365 B1 * | 8/2001 | Hiesener et al. | 244/118.1 |
| 6,318,671 B1 * | 11/2001 | Schumacher et al. | 244/118.5 |
| 6,752,712 B1 * | 6/2004 | Short et al. | 454/76 |
| 6,899,299 B2 * | 5/2005 | Ritts | 244/118.5 |
| 6,991,276 B2 * | 1/2006 | McCauley et al. | 296/37.7 |
| 7,195,202 B2 * | 3/2007 | Leupolz et al. | 244/118.5 |

(Continued)

FOREIGN PATENT DOCUMENTS

| | | |
|---|---|---|
| DE | 4209037 A1 | 9/1993 |
| WO | 9838089 A1 | 9/1998 |

(Continued)

*Primary Examiner* — Michael Carone
*Assistant Examiner* — Steven Hawk
(74) *Attorney, Agent, or Firm* — Lerner, David, Littenberg, Krumholz & Mentlik, LLP (57) ABSTRACT

The present invention describes a modular hatrack for an interior of an aircraft, wherein the modular hatrack comprises at least one container and at least one housing to accommodate the container, wherein at least one component from the group comprising a personal supply channel, an electrical line, a light strip, an air duct for an air conditioning system, and an air outlet for an air conditioning system is integrated in the housing. The present invention also describes the use of the modular hatrack in an aircraft or in some other vehicle.

14 Claims, 5 Drawing Sheets

U.S. PATENT DOCUMENTS

| | | |
|---|---|---|
| 7,309,045 B2 * | 12/2007 | Melberg et al. ............ 244/118.5 |
| 7,588,211 B2 * | 9/2009 | Granzeier et al. ......... 244/118.5 |
| 7,934,678 B2 * | 5/2011 | Wieding et al. ............ 244/118.5 |
| 7,988,091 B2 * | 8/2011 | Wieding et al. ............ 244/118.5 |
| 8,002,218 B2 * | 8/2011 | Johnson ..................... 244/118.5 |
| 2004/0016847 A1 | 1/2004 | Ritts |
| 2006/0157620 A1 * | 7/2006 | Granzeier et al. ......... 244/129.1 |
| 2006/0237585 A1 * | 10/2006 | Lau et al. ................... 244/118.5 |
| 2008/0268762 A1 * | 10/2008 | Bruggen et al. ................ 454/76 |
| 2010/0087131 A1 * | 4/2010 | Stuetzer et al. ................ 454/76 |
| 2011/0253836 A1 * | 10/2011 | Hashberger ................ 244/118.5 |
| 2012/0228425 A1 * | 9/2012 | Schneider et al. ......... 244/118.5 |
| 2012/0228426 A1 * | 9/2012 | Schneider et al. ......... 244/118.5 |

FOREIGN PATENT DOCUMENTS

| | | |
|---|---|---|
| WO | 03024175 A1 | 3/2003 |
| WO | 2005123506 A1 | 12/2005 |
| WO | 2006116074 A1 | 11/2006 |
| WO | 2007022943 A1 | 3/2007 |

* cited by examiner

MODULAR HATRACK FOR A PASSENGER COMPARTMENT OF AIRCRAFT

CROSS-REFERENCE TO RELATED APPLICATIONS

This application is a national phase entry under 35 U.S.C. §371 of International Application No. PCT/EP2008/058275, filed Jun. 27, 2008, published in English, which claims the benefit of the filing date of German Patent Application 10 2007 030 331.0, filed Jun. 29, 2007 and of U.S. Provisional Patent Application No. 60/937,686, filed Jun. 29, 2007, the disclosures of which applications are hereby incorporated herein by reference.

The present invention relates to a modular hatrack for an interior of an aircraft, wherein the modular hatrack comprises a housing and a container. Likewise, the present invention relates to the use of the modular hatrack in a vehicle, including in an aircraft.

In the state of the art, modular hatracks or overhead storage bins and adjacent components and systems of the aircraft, for example cables, pipes, hoses, etc., are usually fastened to the interior structure of the aircraft independently and so as to be separate from each other.

Because of the above, it is necessary to install the different components one after the other within the fuselage or the interior of the aircraft. This results in long installation times and consequently high costs in the production or the refurbishment of an aircraft.

Furthermore, various tolerances or gaps occur, so that space problems, contact or even clashes or squeezing of individual components or parts can occur. Moreover, alignment work is necessary, which in turn can only be carried out inside the aircraft.

Consequently, there may be a requirement for solving the above-mentioned problems of the state of the art.

This requirement is satisfied with the subject according to the main claim 1 of the present patent application.

Expedient embodiments and improvements are stated in the dependent claims.

Furthermore, the use of a modular hatrack according to claim 14 is proposed.

According to a first aspect of the present invention, the modular hatrack for a passenger compartment of an aircraft comprises at least one container and at least one housing to accommodate the container, wherein at least one component from the group comprising a personal supply channel, an electrical line, a light strip, an air duct for an air conditioning system, and an air outlet for an air conditioning system is integrated in the housing.

The term "modular hatrack" refers to a delimited space or a compartment in which, for example, baggage or other objects belonging to passengers or aircrew can be stored.

The term "interior space of an aircraft" or "passenger compartment of an aircraft" refers to that part of the aircraft that comprises the passenger cabin, or that part of the aircraft which accommodates passengers.

The term "container" refers to a device for accommodating objects, in particular items of baggage.

The term "housing" refers to a component of the modular hatrack, which component accommodates the container. The modular hatrack is installed in, or affixed to, the interior of the aircraft, wherein the container can be placed in the housing before or after installation of the modular hatrack.

The term "accommodating the container" refers to the container comprising corresponding dimensions in order to correspondingly fit into the interior of the housing.

The term "personal supply channel", "PSC" or "PSC region", refers to those components in or above the seat region of a passenger, which components make possible a corresponding supply, e.g. of air, oxygen, light and/or acoustics.

The notion that at least one component such as a personal supply channel (PSC region), an electrical line, a light strip, an air duct for an air conditioning system, or an air outlet for an air conditioning system is integrated in the housing refers to the housing preferably comprising one such component such that it provides a hollow space for accommodating a container, and to the component being connected to the housing so as to be fixed thereto. In other words, when installed within the aircraft, the component should not be directedly fixed to the aircraft structure but should be fixed to the housing of the hatrack which is then fixed to the aircraft structure. In this arrangement, forming of the housing can, for example, take place by means of bonded sandwich panels.

The integration of at least one component in the housing provides an advantage in that as many components and systems as possible can be accommodated in the hatrack in a simple and economical manner.

Furthermore, components which, for example, are used to supply the personal supply channel or the entire passenger cabin, e.g. with air-conditioned air, can be integrated. For example, one or several light strips, electrical lines, an air duct for an air conditioning system, and a corresponding air outlet can be integrated in the modular hatrack or in the housing. In addition, inlet pipes and corresponding fastening devices can be integrated. Preferably, all these components together can be integrated in the modular hatrack in order to, in this way, form a module that can be installed as a unit in an aircraft.

In this way the modular hatrack is enlarged and is used not only as a fastening device for the personal supply channel, etc. but also for adjacent components such as cables, pipes, air outlets, hoses, PSC components, oxygen masks, light sources and trim components.

Since the components are located within the hatrack or the personal supply channel of the housing, no or only very slight tolerances and relative movements are experienced so that the PSC components, for example light sources, air supply etc., as well as the other components integrated in the modular hatrack, can be placed together more closely or can be produced so as to be integrated, which results in savings in space and in avoiding clashes or squeezing of the PSC components.

Furthermore, structural fasteners can be saved or combined so that weight savings are achieved. Since many individual components are assembled outside the aircraft, and the housing is subsequently installed as an entity, the time required for installation inside the aircraft is reduced, which results in cost savings.

Moreover, inside the aircraft, alignment and sealing work relating to the components of the housing may no longer be necessary because such work can also take place outside the aircraft.

Moreover, the modular hatrack according to the invention can provide the advantage of stable integration of the modular hatrack in the interior of the aircraft, because the entire housing, i.e. as a single part or component together with the integrated personal supply channel, can be fastened in lateral and vertical manner to an interior wall of the interior of the aircraft by means of the fastening devices that will be described below.

According to a further embodiment of the present invention, it is preferred that all the components from the group comprising a passenger supply channel, an electrical line, a light strip, an air duct for an air conditioning system and an air outlet for an air conditioning system is/are integrated in the housing.

The term "electrical line" preferably refers to a cable or some other connection that allows the electrical transmission of current, for example from an onboard battery or a current generator of the aircraft, to the personal supply channel of the modular hatrack.

The term "light strip" preferably refers to a device for illuminating the interior of the aircraft, in order to ensure better orientation of passengers in the aircraft.

The term "air duct for an air conditioning system" preferably refers to a line or pipe which is arranged at the housing such that the supply of fresh air through the air conditioning system and to the personal supply channel or to an air outlet that supplies the passenger cabin is ensured.

The term "air outlet for the air conditioning system" refers to an opening in the housing, which opening ensures the supply of fresh air by way of the personal supply channel.

The fact that at least one and preferably all of the components can be integrated in the housing may be associated with an advantage in that the prefabricated housing with the individual components mentioned above can be installed in a simple and economical manner in the interior of the aircraft. Furthermore, the advantages already mentioned above also arise.

According to a further embodiment of the present invention, it is preferred if for supplying the interior of the aircraft with air-conditioned fresh air, light and information services for a region underneath the modular hatrack, supply components are integrated in the modular hatrack such that the modular hatrack can be preassembled as a unit.

In this way the modular hatrack arrangement can be designed such that all the media that are to be provided to a passenger seated underneath the modular hatrack arrangement can be provided by components integrated in the modular hatrack arrangement. For example, it is then possible to preassemble supply pipes, electrical lines etc. already outside the aircraft as a unit. Instead of installing all the components individually in the aircraft, as has conventionally been the case, it is thus possible to install the entire unit. In this way aircraft downtimes can be significantly shortened.

According to a further embodiment of the present invention, it is preferred if the personal supply channel comprises at least one component from the group comprising: reading light, cabin illumination, air supply, oxygen mask, loudspeaker, microphone, USB connector, computer connector and trim component.

The reading light, cabin illumination, air supply, oxygen mask, loudspeaker, microphone, USB connector, computer connector and trim component are components of the personal service channel, which components can be arranged in the personal supply channel in the interior of the aircraft in direct proximity to each passenger. This may be associated with an advantage in that the modular hatrack together with the PSC components can be arranged in a simple and economical manner near each individual passenger seat. Furthermore, the above-mentioned advantages relating to stability of attachment of the modular hatrack in the interior of the aircraft result.

According to a further embodiment of the present invention, it is preferred if the housing further comprises a fastening device. The term "fastening device" refers to a component by means of which stable attachment of the modular hatrack to the interior of the aircraft is possible. Optionally, the fastening device can comprise a cable lead-through.

According to a further embodiment of the present invention, it is preferred if the container is pivotable on a pivoting device. In this context the term "pivoting device" refers to a device that holds the container in the housing and also allows movement or pivoting or rotating of the container in the housing on the pivoting device or on some other axis. It is thus possible to pivot the container in a simple and secure manner in the housing.

According to a further embodiment of the present invention, it is preferred if the pivoting device is arranged in the housing. The notion of the pivoting device being arranged in the housing refers to the container and the housing being designed or dimensioned such that simple and safe pivoting motion of the container in the housing is possible.

According to a further embodiment of the present invention, it is preferred if the housing further comprises a groove to at least partially accommodate the pivoted container in the housing. The term "groove" refers to a region in the housing, in which region the container can be accommodated in the housing during pivoting. The size and shape of the groove is designed preferably depending on the position of the pivoting device, and is designed and arranged to ensure easy and unrestricted operation of the container.

Furthermore, in the interior of the housing and on the container a down-stop, namely a device in the shape of a pad, can be arranged, wherein by means of this device the container is prevented from resting against the groove of the housing. This prevents unnecessary wear and tear between the housing and the container from occurring.

The above results in stabilisation of the container after completely pivoting the container out of the housing. This is associated with an advantage in that items of baggage or other items contained in the container of the modular hatrack can either not fall out of the container at all or only with difficulty, if the container is, for example, pivoted out of the housing by uncontrolled movement of the aircraft or by unintended opening by a passenger.

According to a further embodiment of the present invention, it is preferred if the container is open at the top. The term "open at the top" refers to a design which makes it possible for a passenger to place objects, including baggage, into the container without having to open the container at some other location. This results in an advantage in that objects can be placed into the container in a simple manner. Furthermore, the dimensions of the opening of the container result in the already mentioned advantage according to which objects cannot fall from the container, or can do so only with difficulty.

According to further embodiments of the present invention, it is preferred if the container and/or the housing comprise CFRP sandwich panels, wherein CFRP denotes carbon fibre reinforced plastic. The production technology using CFRP sandwich panels is associated with an advantage in that the housing can be produced in a simple and economical manner. Furthermore, the use of CFRP sandwich panels is associated with an advantage in that it results in weight savings.

According to a further embodiment of the present invention, it is preferred if the container comprises a holding strip. A holding strip is a device by means of which it is possible in an easy manner to move or pivot the container from or out of the housing. At the same time the holding strip can be shaped such that the holding strip is illuminated or self-illuminating, or comprises an additional component for firm closure. This results in an advantage in that the container can in a simple manner be moved from the housing and can be fastened. In flight, the holding strip is used to provide support for passengers or for the aircrew when there is turbulence, so that they can more safely move within the aircraft.

According to a further embodiment of the present invention, it is preferred if the container is lockable in the housing. The term "lockable" denotes that by means of a locking action the container cannot be moved from the housing. This is associated with an advantage in that the container is fixed in the housing so that unauthorised persons have no access to the modular hatrack.

According to a further embodiment of the present invention, it is preferred if the modular hatrack and the personal supply channel are equal in length. The term "equal in length" denotes that the modular hatrack and the personal supply channel have the same length in longitudinal direction of the aircraft. This results in an advantage in that the space between several modular hatracks that are arranged side-by-side can be used more efficiently because the volume in the modular hatrack and in the personal supply channel can be optimally matched to each other, so that any unused free spaces are avoided. Furthermore, if several modular hatracks are put in place, the personal supply channels are arranged in a more stable manner so that the advantages already mentioned above result.

According to a further embodiment of the present invention, it is preferred if the housing further comprises a connection for an air conditioning system. The term "air conditioning system" refers to a system for conveying fresh air to the immediate region of the passenger. The connection for an air conditioning system preferably extends on the side of the housing that faces the interior wall of the aircraft. Preferably, the connection for an air conditioning system extends in the middle of the housing. This results in an advantage in that the supply of air from the air conditioning system to the entire cabin can be achieved in a simple and space-saving manner.

According to a further embodiment of the present invention, it is preferred if the modular hatrack is designed to adjoin with positive fit the interior of the aircraft. The notion "adjoin with positive fit" means that the modular hatrack directly adjoins the interior wall of the interior of the aircraft. This results in optimisation of the space available in the interior of the aircraft.

According to a further embodiment of the present invention, it is preferred if between the personal supply channel and the housing an air outlet for the air conditioning system is arranged. In this arrangement, the air outlet is arranged in the region between the container and the passenger supply channel, in which the air of the air conditioning system is fed from the supply pipe to the cabin. The presence of such an air outlet results in an advantage in that tolerances among the individual components can be set outside the aircraft. Sealing and gap dimensioning are thus carried out in an agreeable work position and independently of the installation time in the aircraft.

According to a further embodiment of the present invention, it is preferred if at least one layer for insulation is applied on the housing. The term "layer" refers, for example, to a thickness of an insulation material, for example comprising glass wool, silicon or some other material suitable for insulation purposes. Likewise, the layer is dimensioned according to the surface geometry of the housing. In this arrangement the layer can comprise several parts that cover the side of the housing or of the modular hatrack, which side faces the interior wall of the aircraft. This results in the advantages of optimum acoustic and/or thermal insulation.

According to a further embodiment of the present invention, it is preferred if the housing of the modular hatrack comprises at least one installation opening. The term "installation opening" refers to a device for opening and closing the personal supply channel. This may result in an advantage in that even at some later stage, e.g. during maintenance work on the personal supply channel, simple access to said personal supply channel can take place.

According to a further aspect of the present invention, the use of the modular hatrack in an aircraft or in some other vehicle is preferred.

The use of the present invention in an aircraft or in some other vehicle is associated with an advantage in that the greatest possible number of components and systems of the personal supply channel can be integrated in a simple and economical manner in the housing.

The modular hatrack can thus be of a larger design and together with the personal supply channel serves as a fastening device for adjacent components, for example cables, tubes, hoses, PSC components, oxygen masks, light sources and trim components.

Since the components are located within the housing there are no, or only very small, tolerances and relative movements or clashes, so that the components can be placed more closely against each other, which results in savings in space.

Furthermore, structural fasteners can be saved or combined so that savings in weight result. Since many individual components can be assembled outside the aircraft and since the modular hatrack can be installed as an entire unit, the time used for installing it in the aircraft can be significantly reduced.

Furthermore, alignment and sealing work for the components of the housing in the aircraft are no longer required because this work can also take place outside the aircraft.

Figure 1:
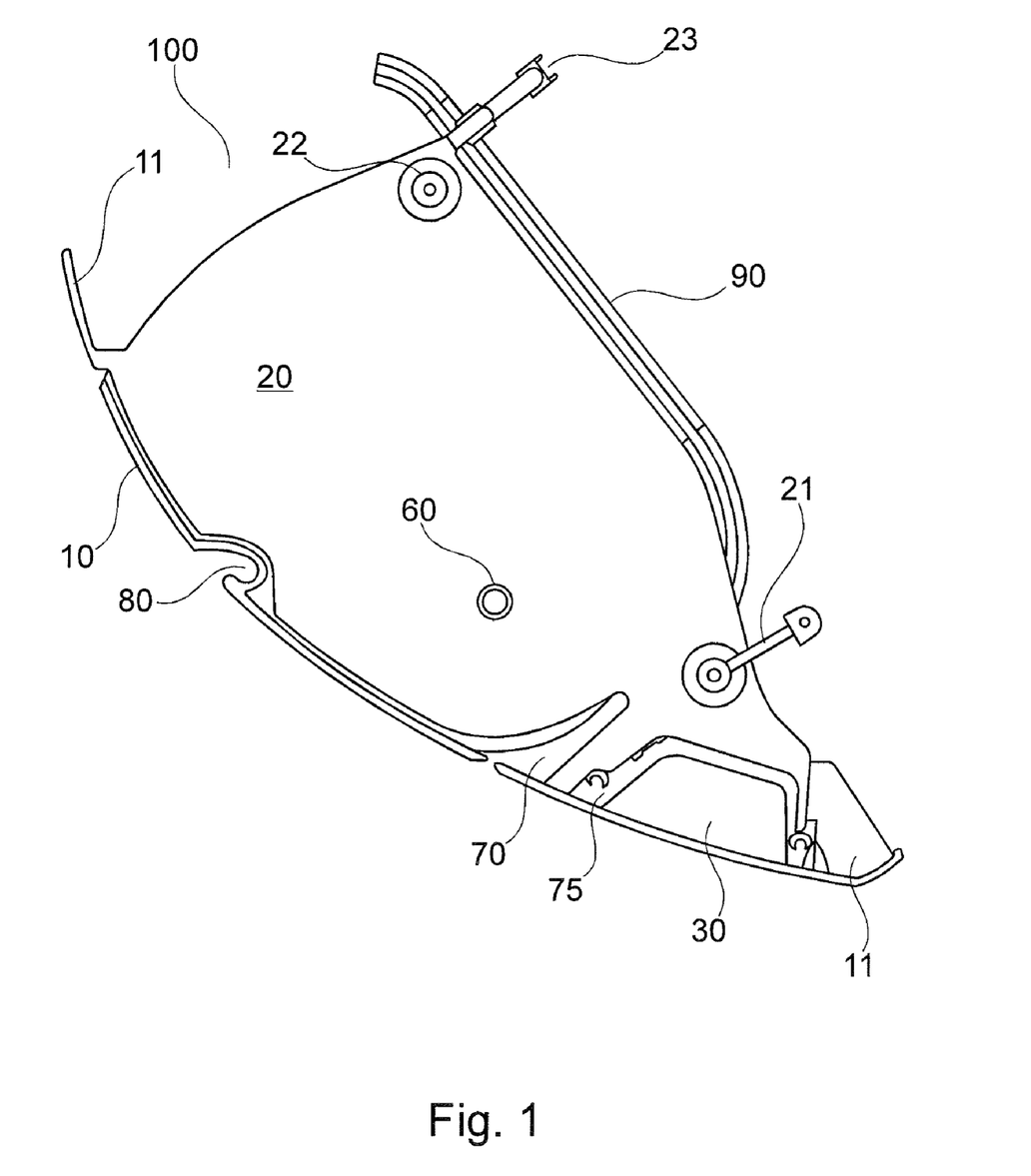
FIG. 1: a lateral view of the closed modular hatrack according to one embodiment of the present invention.

Preferred exemplary embodiments of the invention with additional design details are diagrammatically shown in the drawing in a simplified manner and are described below with reference to the drawings. The following are shown:

FIG. 1 shows a lateral view of the closed modular hatrack 100 according to the invention.

In this embodiment, the modular hatrack 100 comprises a container 10 made of CFRP sandwich panels, which container 10 is arranged in a housing 20 comprising CFRP sandwich panels.

The container 10 is pivotable in the housing 20 on a pivoting device 60.

Moreover, the housing 20 comprises fastening devices 21, 22 and 23 that are used for lateral and vertical attachment to an interior wall of the interior of the aircraft.

FIG. 1 also shows a personal supply channel 30 which is integrated in the housing 20. The personal supply channel 30 is used to ensure individual supply of air, to accommodate reading lights in the passenger region, and to further accommodate at least one oxygen mask, at least one loudspeaker, at least one microphone, one or several USB connectors and/or computer connectors, a well as trim components (not shown).

Furthermore, between the personal supply channel 30 and the housing 20, an air outlet for the air conditioning system 75 is shown, which air outlet is necessary for providing air to the cabin.

Moreover, FIG. 1 shows a holding strip 80, by means of which the container 10 can be pivoted downwards, on the fastening device 60, in the direction of the floor of the aircraft.

In order to make it possible to pivot the container 10 in the housing 20, the housing 20 also comprises a groove 70 in which the container 10 moves when the container 10 is pivoted down in the housing 20.

FIG. 1 further shows a connection 90 for the air conditioning system, which connection ensures a corresponding air supply and an agreeable temperature in the interior 40 of the aircraft or of the cabin.

Lastly, FIG. 1 shows a transparent light strip, designated 11, in the region of which it is, for example, possible to affix a fluorescent lamp (not shown) which helps with orientation in the aircraft.

Figure 2:
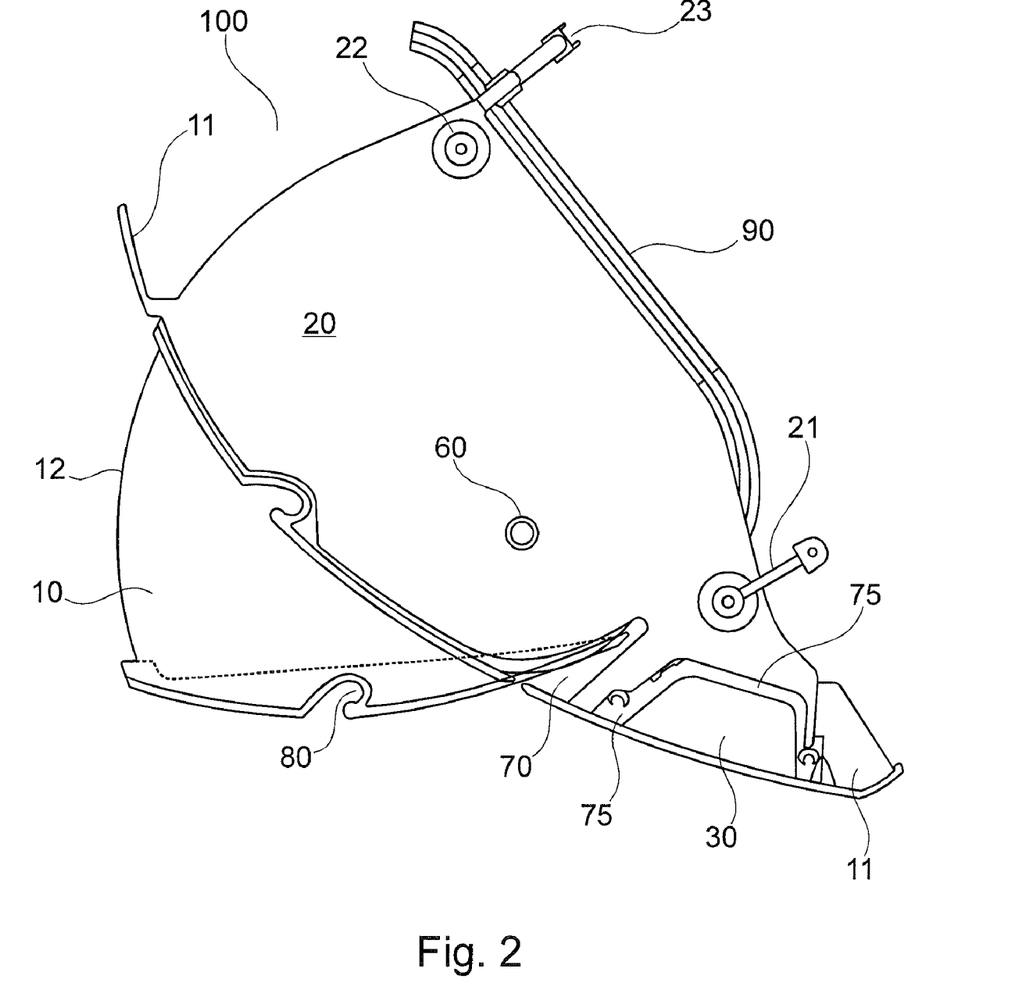
FIG. 2: a lateral view of the open modular hatrack according to one embodiment of the present invention.

FIG. 2 shows a cross-sectional view of the modular hatrack according to the invention in its open state.

In this arrangement essentially the same components of the modular hatrack are shown as is the case in FIG. 1.

In addition, the container 10 is shown, which is pivoted down from, or out of, the housing 20, wherein said container is open at the top. By way of the container opening 12 it is possible for passengers or aircrew to place baggage or other objects in the modular hatrack in a simple manner.

Furthermore, FIG. 2 shows that the container 10 has been inserted in the housing by way of the groove 20. At the same time it is also not possible to open the container any further. This results in an advantage in that objects or items of baggage placed in the modular hatrack 100 will find it difficult to fall from the modular hatrack.

Figure 3:
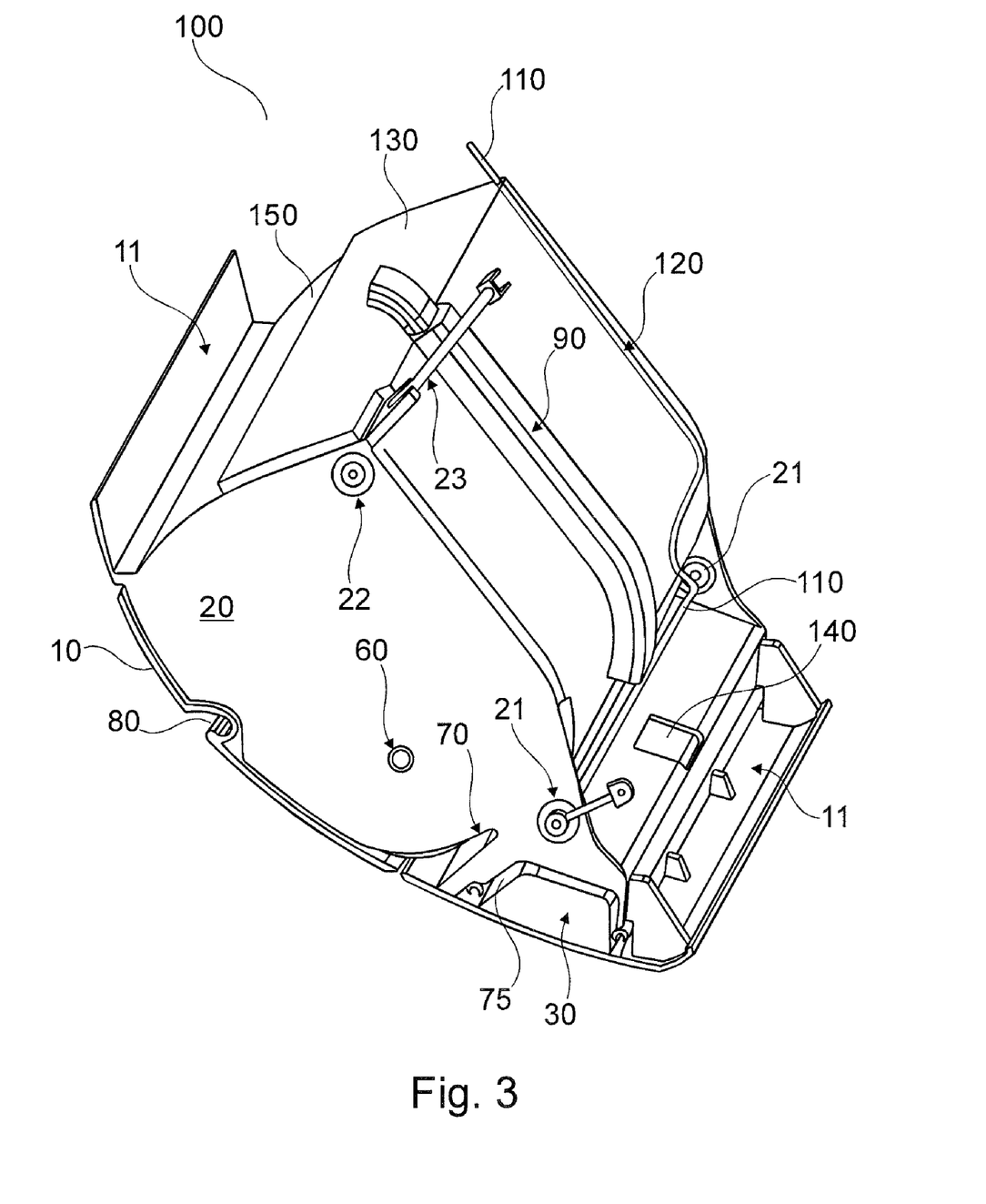
FIG. 3: a three-dimensional view of the modular hatrack according to one embodiment of the present invention.

FIG. 3 shows a three dimensional view of the modular hatrack according to the invention in its closed state.

Apart from the components of the modular hatrack that have already been described in the context of FIGS. 1 and 2, the spatial geometry of the modular hatrack is shown.

FIG. 3 shows that the face 120 of the housing 20, which face 120 will later point towards the interior of the aircraft (not shown) is curved so as to adjoin with positive fit the interior wall 40 of the aircraft (not shown). However, there is no direct contact between the surface of the modular hatrack 100 and the interior 40 of the aircraft. In this arrangement the modular hatrack 100 is spaced apart from the interior wall 40 of the aircraft by approximately 40 mm. As a result of the geometry of the modular hatrack the space available in the interior of the aircraft is used in an optimum manner.

Moreover, FIG. 3 shows the arrangement of the fastening device 23, which is used for lateral attachment of the modular hatrack 100 in the interior of the aircraft (not shown).

Likewise, FIG. 3 shows the spatial routing of the light strips, designated 11, for the placement of fluorescent lamps (not shown).

Reference character 110 shows the spatial routing of an electrical line over the housing 20. Connection to the aircraft system takes place on the top plate 150 of the housing 20. Various electrical lines 110 are held in one connector so that only one connector is necessary in order to connect all the electrical components to the system on the aircraft side. In this way the time used for installation in the aircraft can be shortened.

Furthermore, the length of the personal supply channel is identical to that of the housing 20 or of the modular hatrack 100 so that the advantages already mentioned above result.

Connection 90 for the air conditioning system also takes place, with positive fit, on the surface 120 of the housing 20.

Furthermore, corresponding insulating packages 130 for insulation are affixed to the surface 120 of the housing 20 in order to in this way avoid any vibration and noise resulting from aircraft movement, and in order to ensure thermal insulation.

Reference character 140 designates an installation opening to ensure access, should the need arise, to covered-up components of the personal supply channel.

Figure 4:
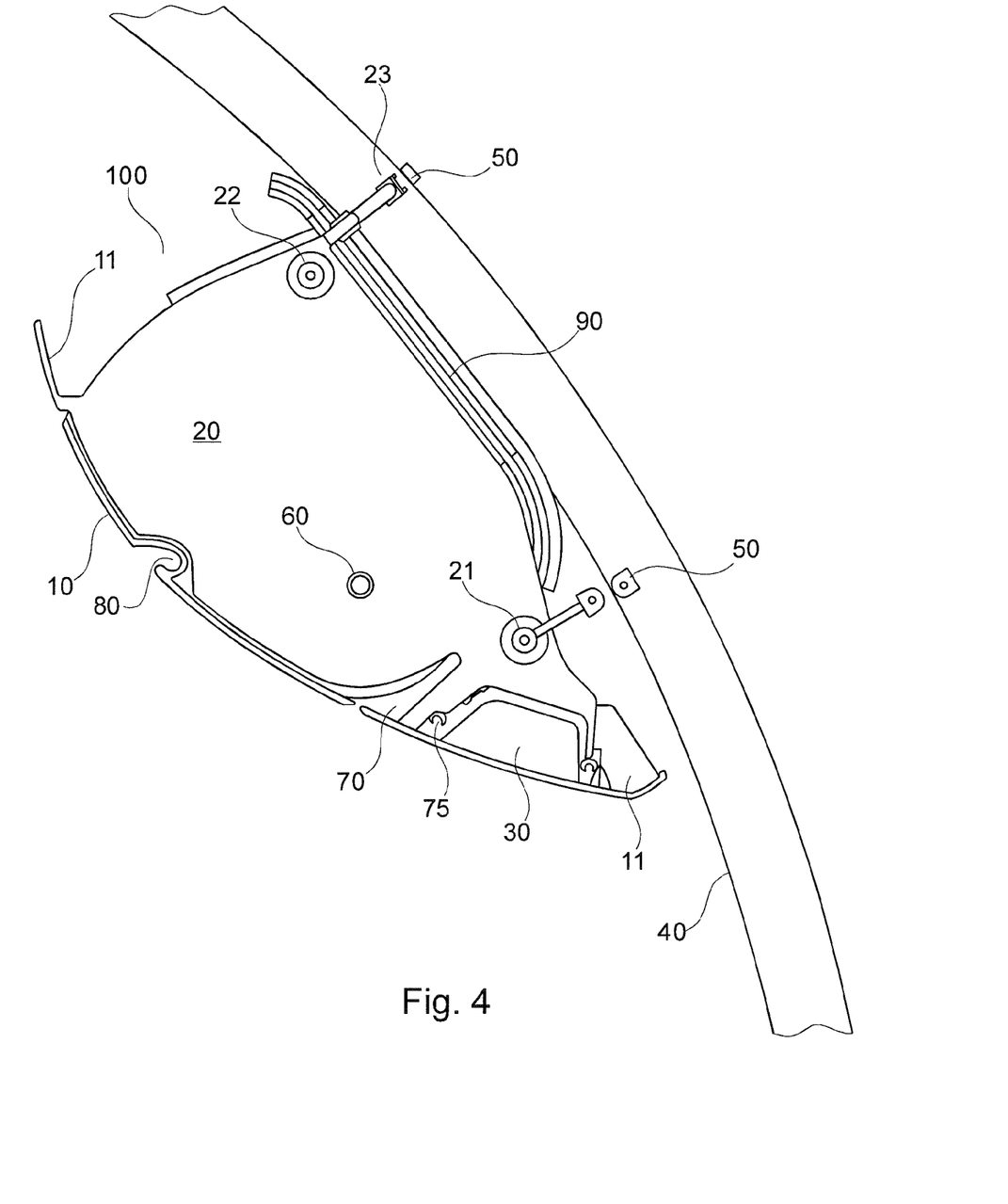
FIG. 4: a lateral view of the modular hatrack after installation in the interior of the aircraft.

FIG. 4 shows a lateral view of the modular hatrack 100 installed in the interior of an aircraft.

Apart from the components of the modular hatrack 100, which components have already been described in FIGS. 1 and 2, the interior wall 40 of the interior of the aircraft is shown. In this arrangement the interior wall directly adjoins the passenger region. Fastening the fastening devices 21, 22 and 23 can take place by way of fastening devices 50 affixed to the interior wall 40 of the aircraft. In this way the fastening devices are situated so as to be as close as possible to the aircraft structure so that weight-optimised transmission of forces can take place.

Figure 5:
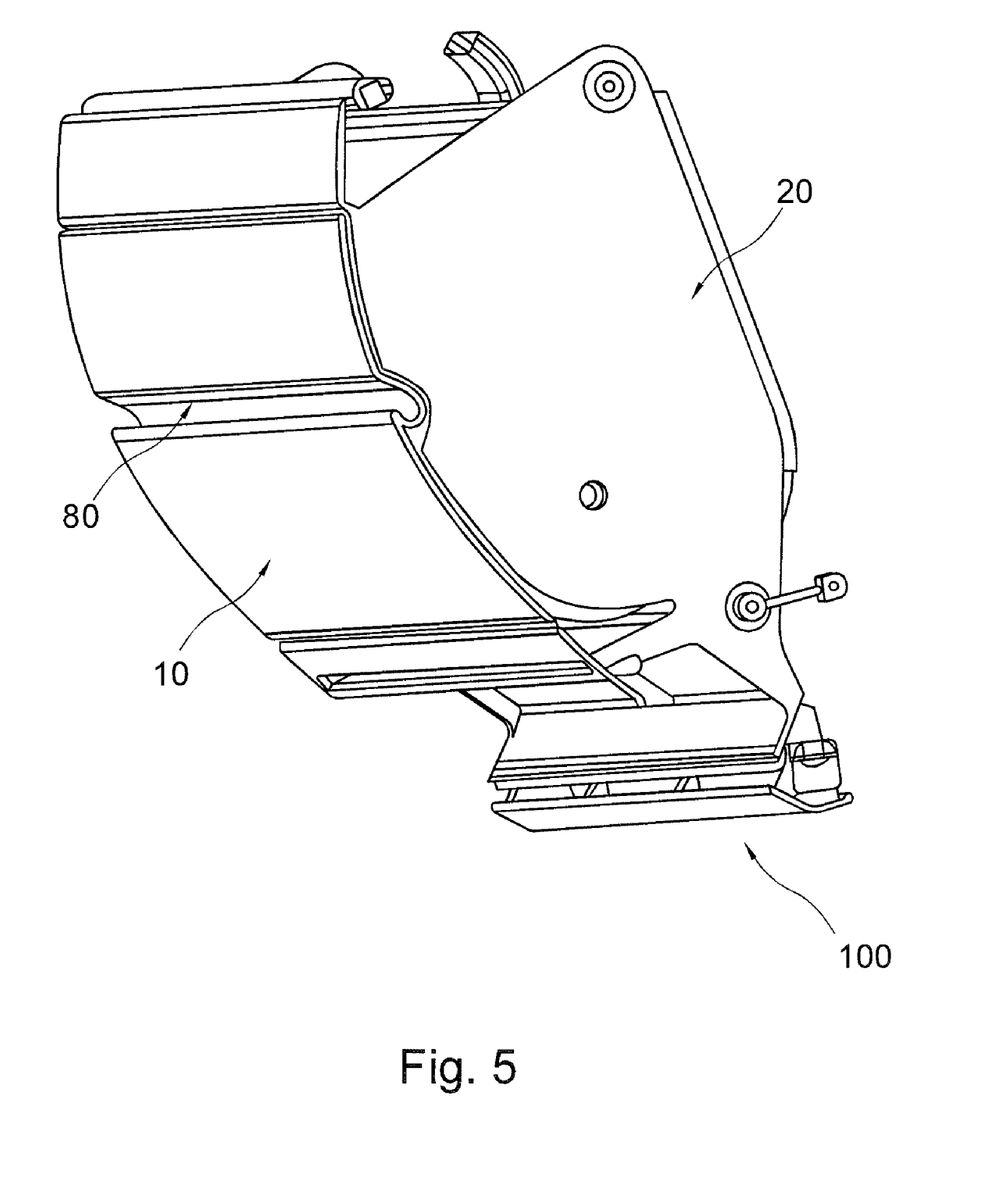
FIG. 5: a three-dimensional view of the modular hatrack according to one embodiment of the present invention.

FIG. 5 shows a three-dimensional view of the modular hatrack 100 according to the invention it its closed state.

Apart from the components of the modular hatrack 100, which components have already been described in FIGS. 1 to 4, the spatial geometry of the modular hatrack 100 is shown.

The drawing shows the detailed arrangement of the holding strip 80 along the entire length of the container 10 of the modular hatrack 100. Furthermore, no other components are shown in the personal supply channel 30. Consequently the geometry of the housing 20 of the modular hatrack 100 is more clearly visible.

Also shown is the right-hand sidewall of the housing 20 of the side of the modular hatrack 100, which side faces the aircraft.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

| List of reference characters | |
|---|---|
| 10 | Container |
| 11 | Light strip |
| 12 | Container opening |
| 20 | Housing |
| 21 | Fastening device |
| 22 | Fastening device |
| 23 | Fastening device |
| 30 | Personal supply channel |
| 40 | Interior wall of the aircraft |
| 50 | Fastening device |
| 60 | Pivoting device |
| 70 | Groove |
| 75 | Air outlet for the air conditioning system |
| 80 | Holding strip |
| 90 | Air duct for the air conditioning system |
| 100 | Modular hatrack |
| 110 | Electrical line |
| 120 | Surface of the housing |
| 130 | Insulating packages |
| 140 | Installation opening |
| 150 | Top plate |

The invention claimed is:

1. A modular hatrack for an interior of an aircraft, wherein the modular hatrack comprises:

at least one container, and at least one housing to accommodate the container, wherein an air duct for an air conditioning system, an air outlet for an air conditioning system and at least one component from the group consisting of a personal supply channel, an electrical line, and a light strip are integrated in the housing, wherein the air duct extends on a face of the housing configured to face an interior wall of the aircraft when the hatrack is installed in the aircraft, and wherein for supplying the interior of the aircraft with air-conditioned fresh air, light and information services for a region underneath the modular hatrack, the supply components are integrated in the modular hatrack such that the modular hatrack can be preassembled as a unit.

2. The modular hatrack of claim 1, wherein all components from the group comprising a personal supply channel, an electrical line, a light strip, an air duct for an air conditioning system, and an air outlet for an air conditioning system are integrated in the housing.

3. The modular hatrack of claim 1, wherein the container comprises CFR plastic.

4. The modular hatrack of claim 1, wherein the housing comprises CFR plastic.

5. The modular hatrack of claim 1, wherein the container comprises a holding strip which extends along the entire length of the container.

6. The modular hatrack of claim 1, wherein the container is lockable in the housing.

7. The modular hatrack of claim 1, wherein the modular hatrack and the personal supply channel are equal in length.

8. The modular hatrack of claim 1, wherein the housing further comprises a connection for an air conditioning system.

9. The modular hatrack of claim 1, wherein between the personal supply channel and the housing an air outlet for the air conditioning system is arranged.

10. The modular hatrack of claim 1, wherein at least one layer for the purpose of insulation is applied on the housing.

11. The modular hatrack of claim 1, wherein the personal supply channel comprises at least one installation flap.

12. The modular hatrack of claim 1, wherein the hatrack comprises fastening means for at least one of the personal supply channel, a cable, a pipe, an air outlet, a hose, a PSC component, an oxygen mask, a light source and a trim component.

13. A vehicle comprising:

a modular hatrack comprising:

at least one container, and at least one housing to accommodate the container, wherein an air duct for an air conditioning system, an air outlet for an air conditioning system and at least one component from the group consisting of a personal supply channel, an electrical line, and a light strip are integrated in the housing, wherein the air duct extends on a face of the housing configured to face an interior wall of the aircraft when the hatrack is installed in the aircraft, and wherein for supplying the interior of the aircraft with air-conditioned fresh air, light and information services for a region underneath the modular hatrack, the supply components are integrated in the modular hatrack such that the modular hatrack can be preassembled as a unit.

14. A modular hatrack for an interior of an aircraft, wherein the modular hatrack comprises:

at least one container, and at least one housing to accommodate the container, wherein all components from the group consisting of a personal supply channel, an electrical line, a light strip, an air duct for an air conditioning system, and an air outlet for an air conditioning system are integrated in the housing, wherein the air duct extends on a face of the housing configured to face an interior wall of the aircraft when the hatrack is installed in the aircraft, and wherein for supplying the interior of the aircraft with air-conditioned fresh air, light and information services for a region underneath the modular hatrack, the supply components are integrated in the modular hatrack such that the modular hatrack can be preassembled as a unit, and wherein the modular hatrack and the personal supply channel are equal in length.

* * * * *